United States Patent [19]

Hoogland

[11] Patent Number: 4,575,195
[45] Date of Patent: Mar. 11, 1986

[54] FLAT FIELD LENSES

[76] Inventor: Jan Hoogland, 41 Los Charros La., Portola Valley, Calif. 94025

[21] Appl. No.: 562,500

[22] Filed: Dec. 16, 1983

Related U.S. Application Data

[63] Continuation-in-part of Ser. No. 268,230, May 29, 1981.

[51] Int. Cl.⁴ .......................... G02B 9/06; G02B 9/12; G02B 13/18
[52] U.S. Cl. .................... 350/432; 350/447; 350/474; 350/480; 350/573
[58] Field of Search ............... 350/412, 474, 480, 573, 350/432, 447

[56] References Cited

U.S. PATENT DOCUMENTS

| | | | |
|---|---|---|---|
| 2,346,062 | 4/1944 | Altman | 350/480 |
| 2,519,760 | 8/1950 | Hett | 350/573 |
| 2,571,308 | 10/1951 | Taylor | 350/480 |
| 2,899,862 | 8/1959 | Baker | 350/573 |
| 4,025,155 | 5/1977 | Imai | 350/573 |
| 4,168,882 | 9/1979 | Hopkins | 350/573 |
| 4,354,730 | 10/1982 | Bel | 350/573 |
| 4,385,810 | 5/1983 | Hamou | 350/573 X |

OTHER PUBLICATIONS

"Systematics of Photographic Lens Design Conference", Jan Hoogland, (Society of Photo-Optical Instrumentation Engineers-1980).

*Primary Examiner*—John K. Corbin
*Assistant Examiner*—Scott J. Sugarman
*Attorney, Agent, or Firm*—Townsend & Townsend

[57] ABSTRACT

A flat field lens system wherein the Petzval sum is corrected without requiring many spaced high powered elements or sharply bent elements. This is achieved by having the Petzval sum correction dominated by the index difference. In an embodiment suitable for use in endoscope transfer optics where medium or high aperture is required, the spherical aberration is best corrected by use of an aspheric surface on the low index material. Where high aperture is not required, as for example in a photographic wide angle objective, spherical aberration is kept low by using a relatively small aperture.

1 Claim, 17 Drawing Figures

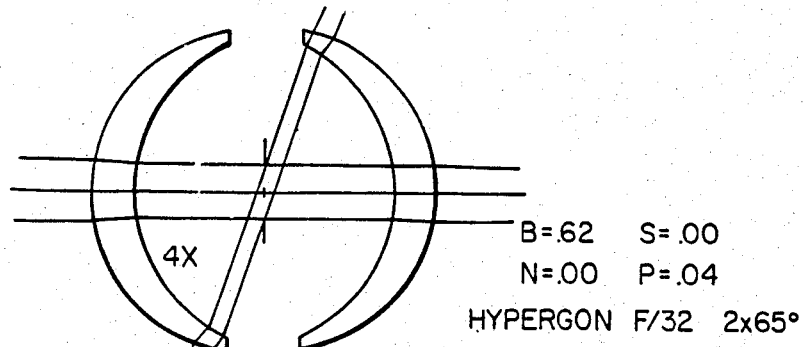
FIG._1A. (PRIOR ART)
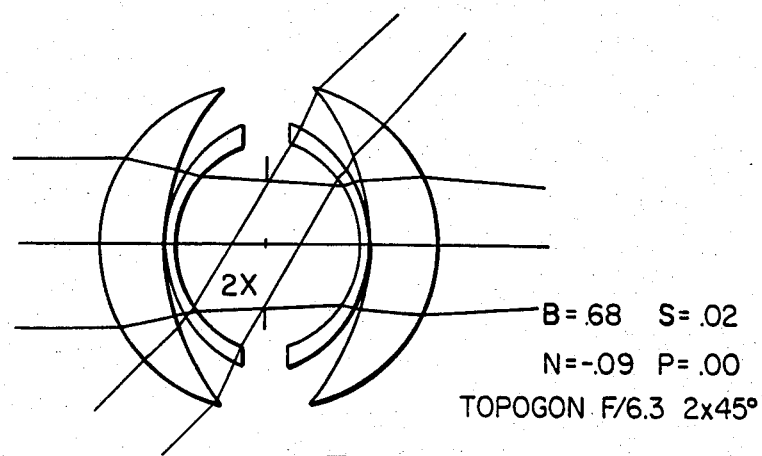
FIG._1B. (PRIOR ART)
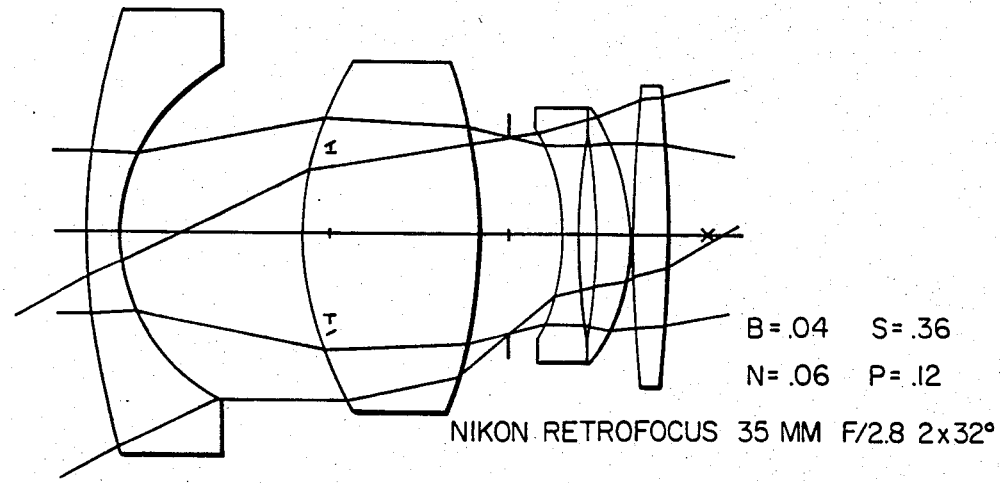
FIG._1C. (PRIOR ART)

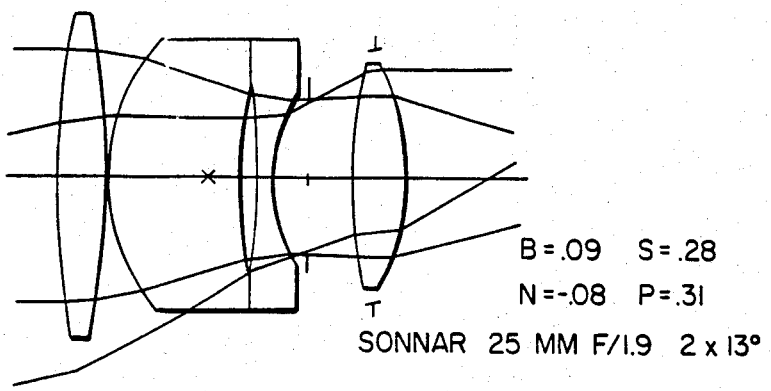
FIG._1D. (PRIOR ART)
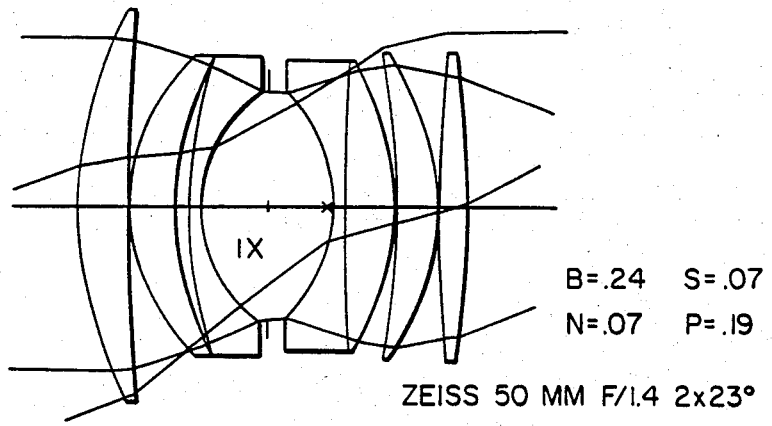
FIG._1E. (PRIOR ART)
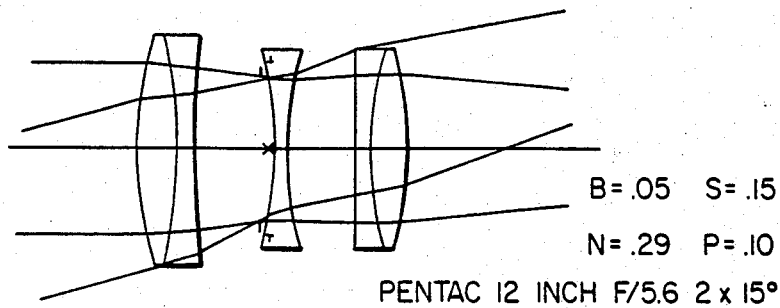
FIG._1F. (PRIOR ART)

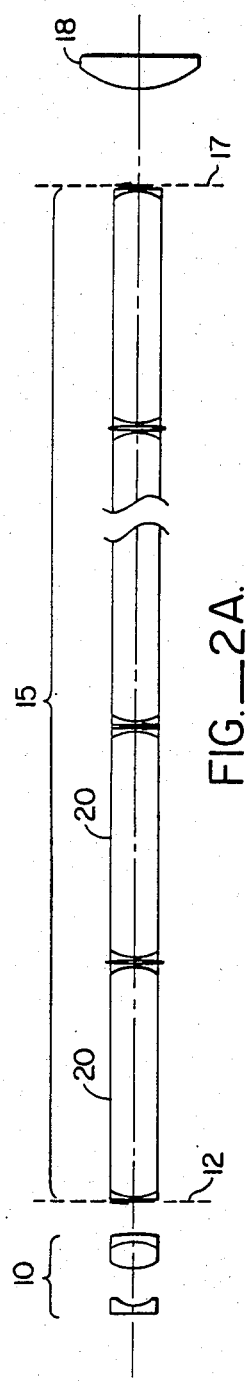
FIG._2A.
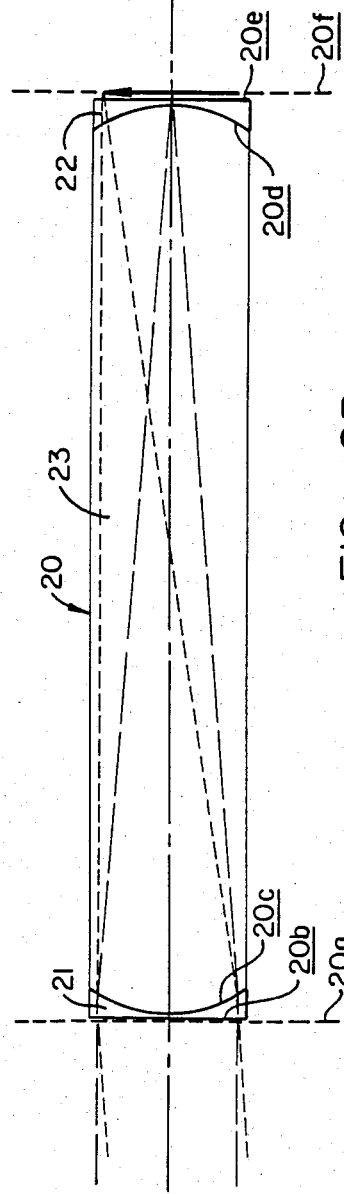
FIG._2B.

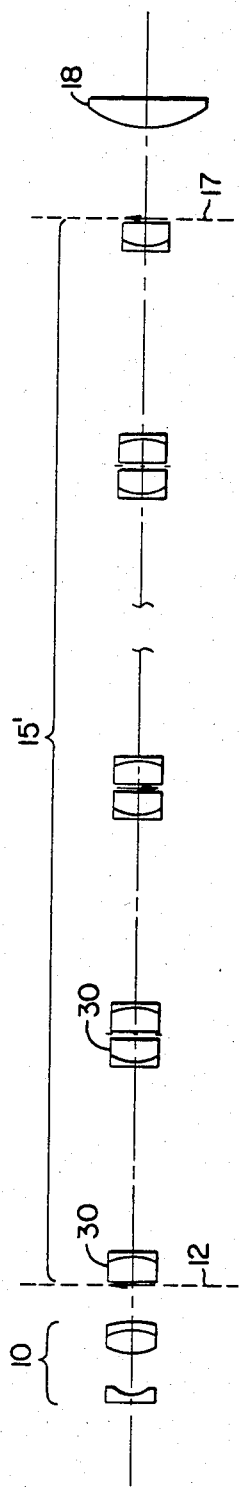
FIG._3A.
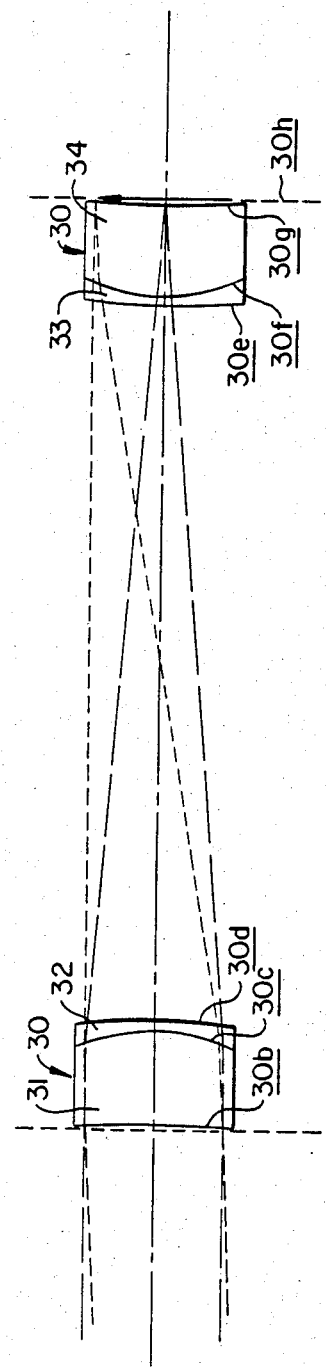
FIG._3B.

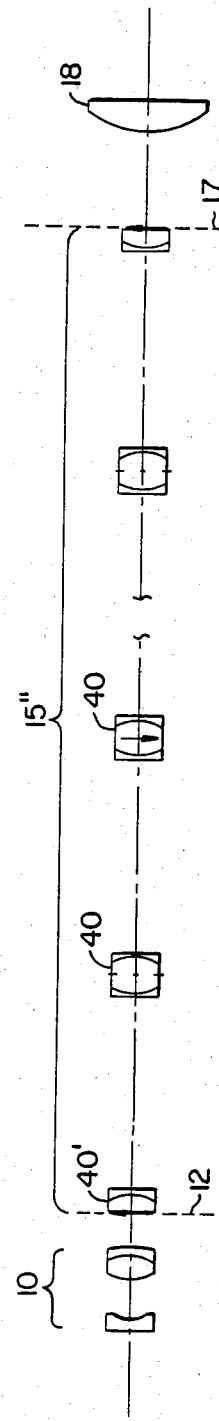
FIG._4A.
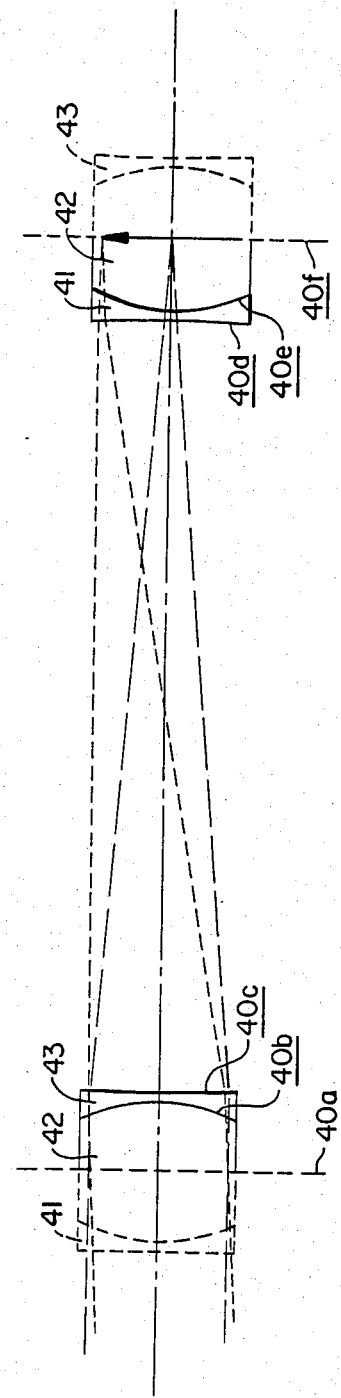
FIG._4B.

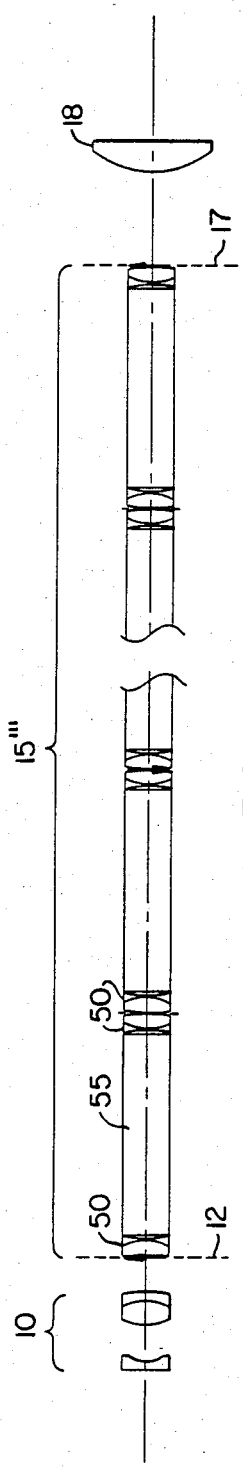
FIG._5A.
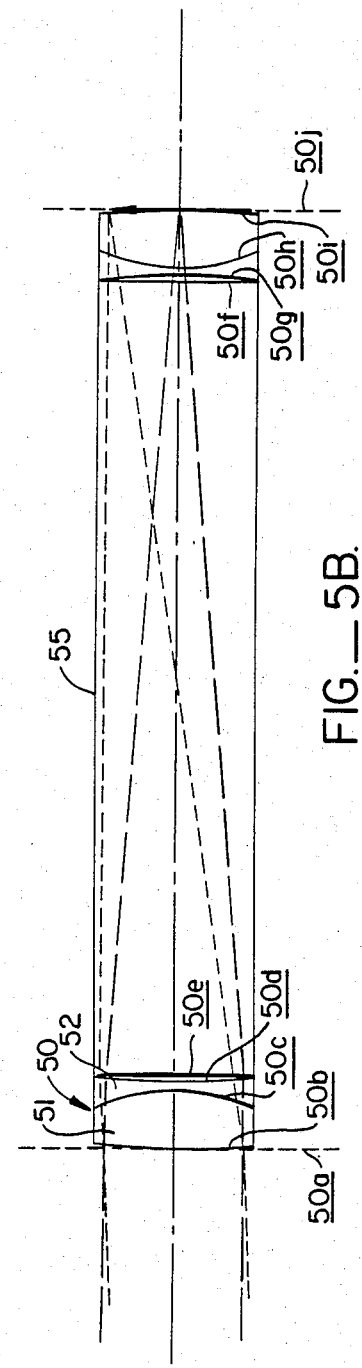
FIG._5B.

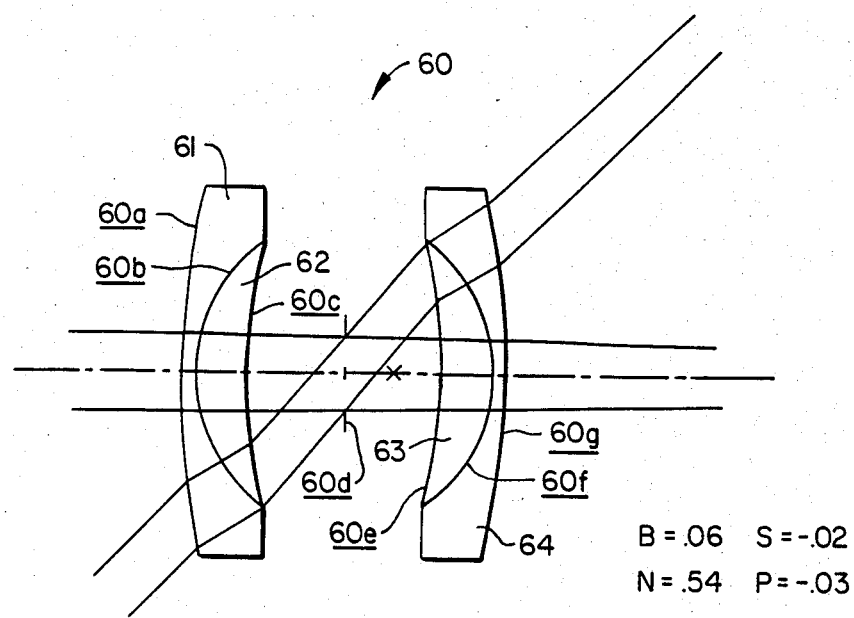
FIG._6.

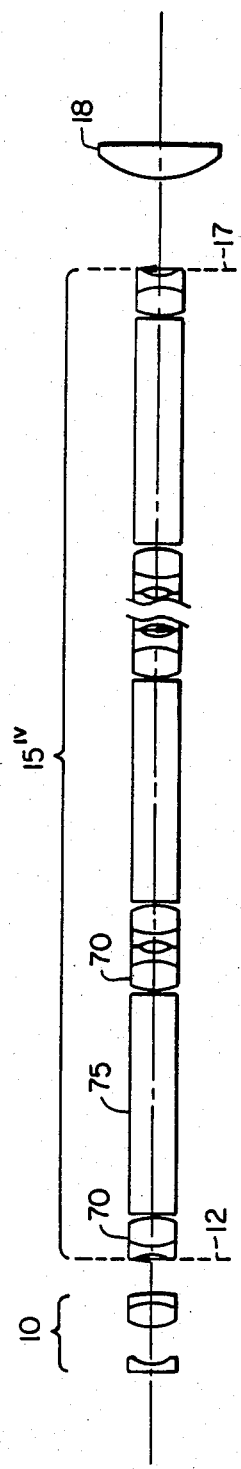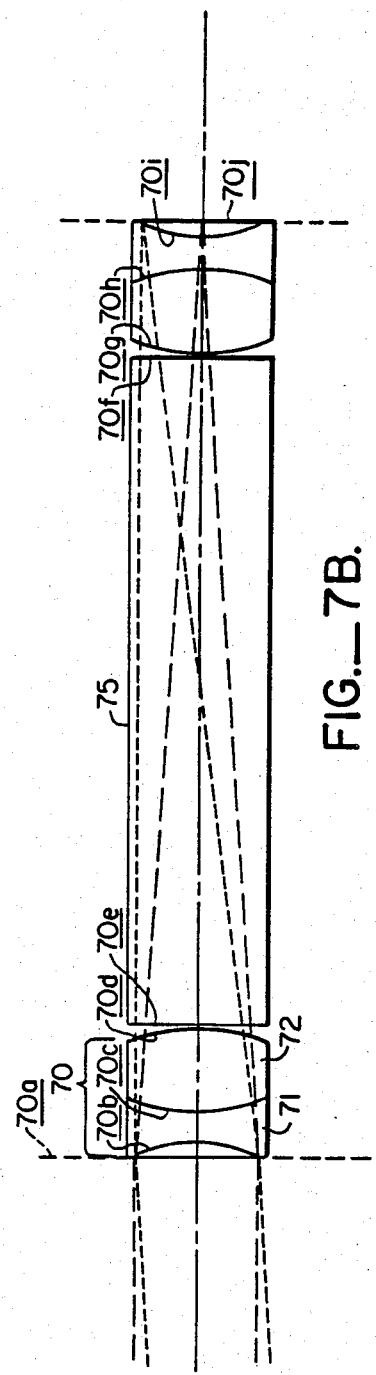
FIG._7A.
FIG._7B.

FLAT FIELD LENSES

This application is a continuation-in-part of copending U.S. patent application Ser. No. 268,230, filed May 29, 1981, the entire disclosure of which is hereby incorporated by reference.

The present invention relates generally to optical lens systems, and more particularly to lenses characterized by a flat field.

BACKGROUND OF THE INVENTION

The presence of a considerable amount of field curvature is a relatively basic feature of most refractive lens systems. However, there are certain applications where a flat field is necessary. Two examples of such applications are photographic objectives and to a somewhat lesser extent endoscope transfer optics. Unfortunately, field curvature is one of the hardest aberrations to correct, requiring increases in the complexity of the lens far in excess of those required to correct spherical and chromatic aberrations. While optical transfer systems typically do not require the same level of field curvature correction as photographic objectives, multiple transfer systems (field lenses as well as relay lenses) are much harder to correct. Thus, considerable effect has gone into designing lenses characterized by flat fields.

Petzval has shown that the field curvature is related to the so-called Petzval sum, P, which is given by:

$$P = \sum_i \phi_i/n_i$$

where $\phi_i$ is the power of the ith refractive surface; and $n_i$ is the refractive index at the ith surface. More particularly, in absence of astigmatism, the field curvature is equal to $-P$. Thus, the radius of curvature of the field of a single lens of unit power is equal to $-1/P = -n$ which represents a strongly curved field. In the case of multiple element lens systems, the Petzval sum strongly tends to be positive because the lens power is positive.

There are three basic methods of correcting the field curvature (reducing the Petzval sum), namely spacing, bending, and index difference. Each has been heralded as a milestone in the design of flat field lenses, and retains its importance today. The first method (spacing) is exemplified by the famous Cooke triplet form designed by H. Dennis Taylor and disclosed in U.S. Pat. No. 568,052. This method is based on the simple idea that an objective comprising a positive lens and a negative lens of equal and opposite powers and the same refractive index has a Petzval sum equal to 0, with the overall power of the system being determined by the separation of the elements. The actual triplet configuration is necessitated by the need to correct other aberrations.

The second basic method of correcting the field curvature (bending) is exemplified in the Hypergon designed by Goerz and disclosed in U.S. Pat. No. 706,650. This method utilizes bending of the elements. In this context, a purely unbent element has equal and opposite curvatures on both sides while the archetypical bent element has equal curvatures on both surfaces. It is noted that such a bent element having equal curvatures at its opposite surfaces represents spaced positive and negative surfaces of equal power and index, so that the Petzval sum vanishes with the overall power being provided by the separation of the two surfaces. Thus, bending represents a special case of separation within a single element. The use of bending to correct the field curvature is the basis of the double Gauss lens which continues to be a lens type of prime importance.

The third basic method of correcting the field curvature (index difference) is the so-called "new achromat" principle, utilizing differences of the refractive indices of the positive and negative elements. This principle, while recognized in the past, has presented problems that have hindered its usefulness. For example, the use of index difference in order to correct the Petzval sum requires the elements to have indices that differ in the opposite direction from what is required to correct spherical aberration. Thus, bent and spaced elements have had to be incorporated into any design attempting to use index difference.

It is possible to conceptualize the situation from a slightly different viewpoint. Rather than viewing the use of spacing, bending, and index difference as means for correcting the field curvature, one may equivalently recognize that the field curvature is largely independent of spacing, bending and index difference. Accordingly, one can select elements such that the Petzval sum vanishes, and then use bending, spacing and index difference to generate the overall power.

Most lens designs utilize a combination of the three methods. Although not previously recognized, a highly meaningful system of lens classification can be based on the relative importance of bending, spacing, and index difference as used to correct the Petzval sum (or generate power). Thus, as will be described below, it is possible to break up the Petzval sum correction into contributions by the various methods, and glean from the relative magnitudes of the individual contributions meaningful information relating to the inner workings of the lens.

It will be recognized that the use of spacing and bending to achieve a flat field lens presents certain problems. For example, when many elements have to be spaced, the system becomes very sensitive to tilt and decentration of the elements, and requires great precision in the lens mounting. In fact, spacing is effective only for relatively high powered components, which increases the criticality of the spacing. Sharply bent elements suffer from the problem that they are expensive to fabricate since only a small number of elements may be placed on the spherical grinding or polishing blocks used during fabrication. Accordingly, flat field lenses have tended to be expensive, both in their elements and in their mounts.

SUMMARY OF THE INVENTION

The present invention provides a flat field lens system wherein the Petzval sum is substantially corrected without requiring any spaced high powered elements or sharply bent elements. The system lends itself to mass production and is highly insensitive to tilt and decentration of the components.

Broadly, the foregoing advantages are achieved in a lens system wherein the Petzval sum correction is dominated by the use of index difference. Physically, the lenses according to the present invention tend to be characterized by cemented positive groups having gentle curvatures on the exposed surfaces. One way of characterizing the lenses mathematically is that the index difference contribution N dominates the total correction where N is as follows:

$$N = \frac{1}{n_{pos}} \sum_i \phi_i - \sum_i \frac{\phi_i}{n_i}$$

where $\phi_i$ is the power of the ith refracting surface, $n_i$ is the refractive index of the ith refracting surface, and $n_{pos}$ is a representative index for the positive element or elements. Other ways of expressing the dominance of the use of index difference will be discussed in the detailed description below.

In an embodiment suitable for use in endoscope relay optics where medium or high aperture is required, the spherical aberration is best corrected by use of an aspherical surface on the low index material. Certain plastics such as polycarbonate, polystyrene and its copolymer with methyl methacrylate have an ideal combination of low refractive index and high dispersion. Where high aperture is not required, as for example in a photographic wide angle objective, spherical aberration may be kept low by using a relatively small aperture.

For a further understanding of the nature and advantages of the present invention, reference should be made to the remaining portions of the specification and the attached drawings.

BRIEF DESCRIPTION OF THE DRAWINGS

FIGS. 1A-1F are optical schematics of illustrative prior art flat field lens designs;

FIGS. 2A-B are optical schematics of an endoscope and an endoscope transfer lens assembly according to a first embodiment of the present invention;

FIGS. 3A-B are optical schematics of an endoscope and an endoscope transfer lens assembly according to a second embodiment of the present invention;

FIGS. 4A-B are optical schematics of an endoscope and an endoscope transfer lens assembly according to a third embodiment of the present invention;

FIGS. 5A-B are optical schematics of an endoscope and an endoscope transfer lens assembly according to a fourth embodiment of the present invention;

FIG. 6 is an optical schematic of a wide angle lens according to the present invention; and FIGS. 7A-B are optical schematics of an endoscope and an endoscope transfer lens assembly according to a fifth embodiment of the present invention.

Cross hatching of the lens elements has been omitted in all the drawings to allow the ray paths to be more clearly seen.

PREFERRED SYSTEM OF CLASSIFICATION AND CHARACTERIZATION OF LENSES AS APPLIED TO PRIOR ART LENS DESIGNS

While lenses have typically been classified either by their date of development, by their complexity, or by their form, none of these classifications provides much insight into the rationale of the various lens designs.

In order to find a suitable basis for classifying lenses, it is useful to consider what one tries to accomplish in the design of a lens. Broadly, the object is to provide optical power and correct the associated aberrations. If one defines the complexity of the lens as the sum of the absolute values of the curvatures of the elements, it can be shown that the greatest increase of complexity arises from attempting to correct the curvature of field.

It has been recognized historically that positive power could be generated without increasing the field curvature by the expedients of spacing the lens elements, bending the lens elements, or utilizing differential indices of refraction. However, it has apparently not been previously recognized that an examination of the relative magnitudes of the different contributions to the correction of the Petzval sum provides a most useful method for classifying the lens as to its actual design rationale. Put another way, an examination of the way that the lens power has been generated while leaving the Petzval sum zero provides such information.

The discussion below will be phrased in terms of contributions to the Petzval sum correction, since that is what is most natural to optical designers. To examine the various contributions, the lens is first "unbent", then "collapsed," and then the index difference contribution and residual evaluated. These will now be described in more detail.

The first step in evaluating the contributions is to "unbend" all the elements and to recompute the overall power of the lens (it being assumed that the lens has originally unit power). To unbend each element, equal curvature is added to each of the surfaces until the two surfaces are rendered equal and opposite in curvature. The contribution to the Petzval sum correction from bending is then given by the negative of the change in power divided by a representative index of refraction $n_{pos}$. Preferably, $n_{pos}$ is the power averaged index over all surfaces of all the positive elements (de-cemented if necessary). For example, if the entire power of the lens were derived from bending, the change in power would be $-1$, and the contribution from bending would be $1/1.62 = 0.62$ (for Schott SK16 having an index of refraction of 1.62).

The second step in evaluating the contributions is to "collapse" the airspaces and the elements by bringing all the spherical refracting surfaces to a single location and recomputing the overall power of the lens. This is equivalent to evaluating the algebraic sum of all surface powers, regardless of location. The contributions to the Petzval sum correction from spacing is then given by the negative of the change in power divided by $n_{pos}$.

The next step is to directly evaluate the contribution due to index difference. This is given by $$N = \frac{1}{n_{pos}} \sum_i \phi_i - \sum_i \frac{\phi_i}{n_i}$$

The residual Petzval sum is then given by $$P = \sum_i \phi_i/n_i$$

At this point, having evaluated the various contributions, the inner workings of the lens may be understood. A few concrete examples are illustrated in FIGS. 1A-1F with the geometrical and optical parameters being tabulated in Appendices 1A-F.

Table 1 sets forth in tabular form the bending contribution B, the spacing contribution S, the index difference contribution N, the residual P, and $1/n_{pos}$ for the various lenses shown in FIGS. 1A-F. It should be noted that the values in Appendices 1A-F are based on the lenses as normalized for unit power, and the contributions are calculated accordingly.

TABLE 1

| Lens | B | S | N | P | $1/n_{pos}$ |
|---|---|---|---|---|---|
| Goerz Hypergon | 0.62 | 0.00 | 0.00 | 0.04 | 0.66 |
| Richter Topogon | 0.68 | 0.02 | −0.09 | 0.00 | 0.62 |
| Nikon retrofocus | 0.04 | 0.36 | 0.06 | 0.12 | 0.59 |

TABLE 1-continued

| Lens | B | S | N | P | $1/n_{pos}$ |
|---|---|---|---|---|---|
| Sonnar | 0.09 | 0.28 | −0.08 | 0.31 | 0.61 |
| Zeiss F/1.4 | 0.24 | 0.07 | 0.07 | 0.19 | 0.56 |
| Pentac | 0.05 | 0.15 | 0.29 | 0.10 | 0.59 |

The Hypergon of FIG. 1A represents a nearly pure case of Petzval sum correction by bending. Similarly, the Topogon of FIG. 1B is dominated by bending. Some correction is also provided by spacing, which is offset by a negative correction due to index difference. The Nikon retrofocus design of FIG. 1C corrects the Petzval sum primarily by means of spacing. The Sonnar of FIG. 1D is characterized by a rather large residual P, but for the total correction, the dominant mechanism is spacing. The modern double Gauss objective of FIG. 1E utilizes all three mechanisms to correct the Petzval sum, while the Pentac of FIG. 1F essentially splits the correction between spacing and index difference.

DESCRIPTION OF THE PREFERRED EMBODIMENTS

The illustrative embodiments to be described below include four embodiments (one example of each) of an optical transfer system as used in an endoscope or the like, and one embodiment (two examples) of a wide angle objective. The description of the transfer systems will be in terms of "transfer modules" which are the portions between successive image planes or pupil planes, or for the symmetric embodiments below, in terms of half modules (portions between an image plane and a pupil plane). It will, however, be appreciated that it is the pair of adjacent quarter modules on either side of an image plane or a pupil plane (i.e. the central half of the whole module) that may be said to act as a field lens or a relay lens and for which the power is well defined.

FIG. 2A is an optical schematic of a first embodiment of an endoscope optical system. The system comprises an objective 10 for forming an image in a first image plane 12, a transfer system 15 for transmitting the image in plane 12 to a second image plane 17, and an eyepiece 18 for viewing the transmitted image. Objective 10 and transfer system 15 occupy a relatively small diameter barrel which is typically surrounded by an annular fiber optics bundle. In use, the endoscope is inserted within a body cavity or the like for viewing of internal body regions by a physician. Objective 10 forms an image of the region to be viewed at first image plane 12, which image is transmitted by transfer system 15 to second image plane 17 proximate eyepiece 18 for viewing by the examining physician.

In a first embodiment, transfer system 15 comprises a plurality of cemented triplet assemblies 20 which represent an illustrative embodiment of the present invention. It will be appreciated that triplets 20 should be characterized by a field that is well corrected for field curvature in order that the image in plane 12 may be properly transmitted to the eyepiece. Triplets 20 are arranged in pairs, with each pair providing a transfer module.

FIG. 2B is an optical schematic of one of triplets 20 illustrating the detailed construction thereof. In the preferred embodiment, triplets 20 are all identical, and as will be seen, are also symmetric from end to end. Triplet 20 includes first and second negative end elements 21 and 22 separated by a central elongate positive element 23. The geometrical characteristics of triplet 20 are defined by an entrance pupil plane 20a, a front surface 20b, a first cemented surface 20c, a second cemented surface 20d, a rear surface 20e, and an image plane 20f. An aperture stop is also provided at the surface 20f in order to define the field and avoid reflections off the endoscope optical barrel. The proper spacing of triplets 20 and the definition of the entrance pupil and field are conveniently provided by spacer rings (not shown) which may be cemented to the lenses prior to insertion within the barrel. The geometrical and optical parameters for a specific embodiment of triplet 20 are given in Appendix 2. The following system of nomenclature will be adopted. The radius of a given surface $20i$ will be designated $r_i$; the distance between a given pair of adjacent surfaces $20j$ and $20k$ will be designated $t_{jk}$; the index of the refraction and Abbe number of the medium between surfaces $10j$ and $10k$ will be designated $n_{jk}$ and $v_{jk}$; and the diameter of a stop in plane $20i$ will be designated $d_i$. The dimensions are normalized so that a complete transfer module has a length of four units, which corresponds to unit focal length. Front and rear surfaces 20b and 20e also have an aspheric component characterized by the aspheric coefficients AD, AE, AF, and AG. These coefficients define a surface having base radius R and tangent to the X-Y plane at the origin having as its equation:

$$Z = R - \sqrt{R^2 - \rho^2} + AD\rho^4 + AE\rho^6 + AF\rho^8 + AG\rho^{10}$$

where $\rho^2 = x^2 + y^2$.

The general method of designing triplet assembly 20 may be outlined as follows. First, with the general configuration in mind, two reasonable indices of refraction are determined from a choice of suitable materials. For example, end elements 21 and 22 are formed of polystyrene which is characterized by high dispersion and low index of refraction, and is easy to injection mold. Central element 23 is formed of a crown glass having low dispersion and high index of refraction. Central element 23 provides strength for the cemented assembly.

Having determined the indices of refraction, and further imposing the requirement that the assembly be symmetric, the powers of the individual elements are determined by requiring the Petzval sum to vanish and further requiring a given overall power. At this point, the dispersions of material may be chosen to correct chromatic aberration. Spherical aberration, coma, and astigmatism are not yet corrected. However, the provision of an aspheric surface on outside elements 21 and 22 corrects spherical aberration, it being noted that with injection molding, it is no more difficult to provide an aspheric surface than a spherical surface. The stop location is now chosen to correct astigmatism, while coma and distortion are corrected by utilizing a symmetrical configuration with two identical axially aligned assemblies. It is noted that this embodiment has residual astigmatism which may compensate astigmatism in either the objective or the eyepiece.

The advantages of the design of assembly 20 may be seen. First, while each transfer module comprises six elements, there are only two different elements, namely the plastic end element and the central glass element. Furthermore, as described above, the plastic end elements may be injection molded. Steep surfaces as are characteristic of sharply bent elements are avoided, and assembly of the overall system is simple.

FIG. 3A is an optical schematic of a second embodiment of an endoscope optical system which differs from the optical system of FIG. 2A in its transfer system 15'.

Like reference numerals are used for the objective, the eyepiece, and first and second image planes. In this second embodiment, transfer system 15' comprises a plurality of cemented doublet assemblies 30, arranged in groups of four, each group of four providing a transfer module.

FIG. 3B is an optical schematic of a pair of the doublet assemblies that provide half a transfer module. The pair includes a first positive element 31, a first negative element 32 cemented thereto, a second negative element 33 spaced apart from negative element 32, and a second positive element 34 cemented to element 33. Negative elements 31 and 33, and positive elements 32 and 34 are preferably identical. The geometrical characteristics are defined by an entrance pupil plane 30a, a front surface 30b, a first cemented surface 30c, a first inside surface 30d, a second inside surface 30e, a second cemented surface 30f, a rear surface 30g, and an image plane 30h. The proper spacing of doublet assemblies 30 and the definition of the entrance pupil and field are conveniently provided by cylindrical spacers (not shown). The geometrical and optical parameters for a specific embodiment of doublets 30 are given in Appendix 3. As stated above, all of doublets 30 are preferably identical, although alternately reversed end for end. The same system of nomenclature as used for Appendix 2 is used. First and second inside surfaces 30d and 30e have an aspheric component characterized by the aspheric coefficients AD, AE, AF, and AG.

The design considerations for doublet assemblies 30 are generally similar to those disclosed for triplet assemblies 20. Transfer system 15' is characterized by a substantially complete elimination of astigmatism which may be desirable for certain applications. As with transfer system 15, transfer system 15' only requires two different elements.

FIG. 4A is an optical schematic of a third embodiment of an endoscope optical system having a different transfer system 15''. Transfer system 15'' is similar to transfer system 15' and can be conceptualized as the limiting case where the surfaces corresponding to 30b and 30h are flat, and the distance between surfaces 30g and 30h is zero, so that adjacent pairs of doublets 30 bcome triplets. Thus, transfer system 15'' comprises a plurality of cemented triplet assemblies 40 with a half triplet (doublet) 40' at each end. A complete transfer module within transfer system 15'' comprises a half triplet (or doublet), a triplet, and a second half triplet (or doublet).

FIG. 4B is an optical schematic of the portions between successive medial planes of triplets 40. This corresponds to half a transfer module. It will be appreciated that either of the half triplets shown could be one of doublets 40'. Each triplet includes a first negative element 41, a central positive element 42, and a second negative element 43. For consistency of nomenclature, the surfaces will be named serially from one medial plane to the next. The system is characterized by a medial plane 40a within the first triplet, a cemented surface 40b within the first triplet, an exposed surface 40c on the first triplet, an exposed surface 40d on the second triplet, a cemented surface 40e in the second triplet, and a medial plane 40f within the second triplet. The proper spacing of lenses 40 and 40' is conveniently provided by cylindrical spacers (not shown). The aperture stop and field stop are provided in the medial planes. The geometrical and optical parameters for a specific embodiment are given in Appendix 4. The exposed surfaces of negative elements 41 and 43 (surfaces 40c and 40d) are characterized by a base radius and aspheric coefficients AD, AE, AF, and AG.

It is noted that while transfer system 15'' has fewer components than transfer system 15', it requires three different elements, namely the plastic end element, the glass central element for the triplet, and the glass "half element" for the doublet. However, transfer system 15'' could be implemented using triplets alone, so long as the eyepiece and objective are designed in recognition of the fact that there are, in effect, extra half triplets at the front and back ends of the system.

FIG. 5A is an optical schematic of a fourth embodiment of an endoscope optical system having a different transfer system 15'''. Transfer system 15''' resembles transfer system 15' in that a transfer module comprises four cemented doublet assemblies 50, but differs in that the large airspace within each half module is replaced by a glass cylinder 55. The provision of the cylinder in this airspace permits greater information transfer. It is noted parenthetically that a similar design modification would be implemented in connection with suitably modified triplets corresponding to triplets 40 of transfer system 15' shown in FIGS. 4A-B.

FIG. 5B is an optical schematic of half a transfer module comprising two symmetrically disposed doublets 50 with cylinder 55 in between. Each doublet 50 includes a positive element 51 and a negative element 52, and the half module is characterized by an entrance pupil plane 50a, a front surface 50b, a first cemented surface 50c, a first inside surface 50d, first and second cylinder surfaces 50e and 50f, a second inside surface 50g, a second cemented surface 50h, a rear surface 50i, and an image plane 50j. The geometrical and optical parameters for a specific embodiment of doublets 50 and cylinder 55 are given in Appendix 5. It is noted that first and second inside surfaces 50d and 50g are characterized by a base radius and aspheric coefficients AD, AE, AF, and AG.

FIG. 7A is an optical schematic of a fifth embodiment of an endoscope optical system having a different transfer system $15^{iv}$. Transfer system $15^{iv}$ resembles transfer system 15''' in that a transfer module comprises four cemented doublet assemblies 70 and two glass cylinders 75, but differs in that the positive element in the doublet is closest to the cylinder.

FIG. 7B is an optical schematic of half a transfer module comprising two symmetrically disposed doublets 70 with cylinder 75 in between. Each doublet 70 includes a negative element 71 and a positive element 72, and the half module is characterized by an entrance pupil plane 70a, a front surface 70b, a first cemented surface 70c, a first inside surface 70d, first and second cylinder surfaces 70e, and 70f, a second inside surface 70g, a second cemented surface 70h, a rear surface 70i, and an image plane 70j. The geometrical and optical parameters for a specific embodiment of doublets 70 and cylinder 75 are given in Appendix 7. It is noted that front and rear surfaces 70b and 70i are characterized by a base radius and aspheric coefficients AD, AE, AF, and AG. It is also noted that the normalization differs from that in the above cases in that half a transfer module is 227 units in length and about 35 units in diameter. The actual diameter of all the optical transfer embodiments is on the order of 2.5–3.5 mm.

FIG. 6 is an optical schematic of a wide angle lens 60 constructed according to the present invention. Wide angle lens 60 includes four elements arranged in cemented pairs, including a negative front element 61, a positive element 62 cemented thereto, a spaced positive element 63 and a negative rear element 64 cemented thereto. Lens 60 is characterized by a front surface 60a, a first cemented surface 60b, a first inside surface 60c, an aperture stop plane 60d, a second inside surface 60e, a second cemented surface 60f, and a rear surface 60g. The geometrical and optical parameters for two embodiments of wide angle lens 60 are set forth in Appendices 6A and 6B with the same nomenclature as used for the endoscope transfer systems discussed above.

This is a very wide angle lens (corresponding to 18 mm focal length if scaled for 35 mm photography). While a little on the slow side, the lens is characterized by extremely low distortion, and thus is an excellent lens for architectural photography.

Table 2 sets forth in tabular form the Petzval sum correction contributions B, S, and N, the residual P, and $1/n_{pos}$ for the endoscope transfer lenses of FIGS. 2B, 3B, 4B, and 5B and for the two wide angle objectives of FIG. 6. All values are normalized for unit power. It is noted that for each of the transfer systems, the values and the power are for the central half of a transfer module.

TABLE 2

| Lens | B | S | N | P | $1/n_{pos}$ |
|---|---|---|---|---|---|
| transfer (App. 2) | .00 | .00 | .20 | .35 | .55 |
| transfer (App. 3) | .00 | −.04 | .17 | .43 | .56 |
| transfer (App. 4) | .00 | −.02 | .36 | .19 | .53 |
| transfer (App. 5) | .00 | −.02 | .29 | .26 | .53 |
| wide angle (App. 6A) | .06 | −.02 | .54 | −.03 | .56 |
| wide angle (App. 6B) | .08 | −.02 | .49 | −.01 | .53 |

The features of the present invention may be seen. Most striking is that the index difference contribution N dominates the total contribution B+S+N, ranging from about 67% to 130%. The pentac (FIG. 1F) is an extreme prior art situation, and the ratio is less than 60%. A ratio of about ⅔ to ¾ appears to be a fair statement of the lower limit for the present invention. It is also noted that the photographic objectives are very well corrected, in fact a little overcorrected. While at first glance the residual values P for the transfer systems appear somewhat high, several points must be kept in mind. First, the values are still generally less than other prior art transfer systems. Second, the object field for endoscopy is typically curved, and so some field curvature may be preferable to compensate for this. Third, the design easily admits to any desired reduction of the Petzval sum, but a greater reduction tends to require sharper internal curvatures. The examples represent a compromise that has relatively gentle curves and is thus easy to fabricate.

In summary, it can be seen that the present invention provides a flat field lens system which eliminates the need for multiple spaced elements and sharply bent elements and is thus highly insensitive to tilt and decentration of the components. The lenses of the present invention may be configured in many ways for use in many applications.

While the above represents a full and complete disclosure of the preferred embodiments of the present invention, various modifications, alternate constructions, and equivalents may be employed without departing from the true spirit and scope of the invention. For example, the endoscope relay embodiments described above are characterized by having the aspheric surface on the negative (lower index material) element. However, while in the past it has been more convenient to use a plastic element onto which the aspheric surface can be molded, Corning Glass Works has recently announced the capability of producing aspheric surfaces on glass. Accordingly, there is no longer any need to use plastic as the lower index material or to place the aspheric surface on the negative element.

Additionally, while the photographic objectives are very well corrected for field curvature (residual Petzval sum P is very small), the present invention may also be employed where the Petzval sum is not to be completely corrected, so long as the index difference contribution dominates the total correction. Thus, the present invention is drawn to the index difference being the dominant mechanism for achieving the correction of the Petzval sum to whatever level is desired.

Moreover, while the contributions were shown as being calculated in a particular way, it will be appreciated that one could calculate the contributions in slightly different ways without materially affecting the relative magnitudes thereof. For example, the bending contribution could be calculated by adding curvatures to opposite surfaces of an element until one of the surfaces was flat (rather than until a symmetrical configuration was achieved). Therefore, the above description and illustrations should not be construed as limiting the scope of the invention which is defined in the appended claims.

Appendix 1A
(Prior Art)
Goerz Hypergon

Focal Length: EFL = 1.0000
Aperture ratio: 1:32
Back Focal Length: BFL = .8986
Field Angle: 2 × 65°

| Surface No. | Radius | Distance to Next Surface | Refractive Index | Abbe Number |
|---|---|---|---|---|
| 1 | 0.0846 | | | |
| | | 0.0220 | 1.5201 | 64.9 |
| 2 | 0.0850 | | | |
| | | 0.0679 | | |
| 3 | Aperture stop | | | |
| | | 0.0679 | | |
| 4 | −0.0850 | | | |
| | | 0.0220 | 1.5201 | 64.9 |
| 5 | −0.0846 | | | |

Appendix 1B
(Prior Art)
Richter Topogon

Focal Length: EFL = 1.0000
Aperture ratio: 1:6.3
Back Focal Length: BFL = .7860
Field Angle: 2 × 50°

| Surface No. | Radius | Distance to Next Surface | Refractive Index | Abbe Number |
|---|---|---|---|---|
| 1 | 0.1707 | | | |
| | | 0.0674 | 1.6229 | 60.1 |
| 2 | 0.2511 | | | |
| | | 0.0003 | | |
| 3 | 0.1380 | | | |
| | | 0.0076 | 1.7231 | 29.3 |
| 4 | 0.1115 | | | |
| | | 0.0985 | | |
| 5 | Aperture stop | | | |
| | | 0.0985 | | |
| 6 | −0.1115 | | | |
| | | 0.0076 | 1.7231 | 29.3 |
| 7 | −0.1380 | | | |
| | | 0.0003 | | |

-continued

Appendix 1B
(Prior Art)
Richter Topogon

| | | | |
|---|---|---|---|
| 8 | −0.2511 | | |
| | | 0.0674 | 1.6229 | 60.1 |
| 9 | −0.1707 | | |

Appendix 1C
(Prior Art)
Nikon Retrofocus (35 mm)

Focal Length: EFL = 1.0000
Aperture ratio: 1:2.8
Back Focal Length: BFL = 1.0844
Field Angle: 2 × 31°

| Surface No. | Radius | Distance to Next Surface | Refractive Index | Abbe Number |
|---|---|---|---|---|
| 1 | 1.5546 | | | |
| | | 0.0700 | 1.5203 | 58.7 |
| 2 | 0.4066 | | | |
| | | 0.3966 | | |
| 3 | 0.6884 | | | |
| | | 0.3717 | 1.7162 | 53.6 |
| 4 | −1.1160 | | | |
| | | 0.0619 | | |
| 5 | Aperture stop | | | |
| | | 0.1100 | | |
| 6 | −0.4995 | | | |
| | | 0.0360 | 1.7231 | 29.3 |
| 7 | 1.3178 | | | |
| | | 0.0360 | | |
| 8 | −1.3877 | | | |
| | | 0.0700 | 1.7468 | 47.9 |
| 9 | −0.4716 | | | |
| | | 0.0030 | | |
| 10 | 3.2470 | | | |
| | | 0.0700 | 1.6229 | 60.1 |
| 11 | −1.8467 | | | |

Appendix 1D
(Prior Art)
Sonnar

Focal Length: EFL = 1.0000
Aperture ratio: 1:1.9
Back Focal Length: BFL = .5793
Field Angle: 2 × 13°

| Surface No. | Radius | Distance to Next Surface | Refractive Index | Abbe Number |
|---|---|---|---|---|
| 1 | 1.8792 | | | |
| | | 0.1000 | 1.5187 | 64.0 |
| 2 | −1.8792 | | | |
| | | 0.0050 | | |
| 3 | 0.4240 | | | |
| | | 0.2719 | 1.6152 | 58.4 |
| 4 | 0.7659 | | | |
| | | 0.0400 | | |
| 5 | −1.3207 | | | |
| | | 0.0300 | 1.7231 | 29.3 |
| 6 | 0.3253 | | | |
| | | 0.0600 | | |
| 7 | Aperture stop | | | |
| | | 0.1098 | | |
| 8 | 1.0864 | | | |
| | | 0.1100 | 1.6940 | 54.5 |
| 9 | −0.5267 | | | |

Appendix 1E
(Prior Art)
Zeiss Double Gauss (50 mm)

Focal Length: EFL = 1.0000
Aperture ratio: 1:1.4

Appendix 1E
(Prior Art)
Zeiss Double Gauss (50 mm)

Back Focal Length: BFL = .7098
Field Angle: 2 × 23½°

| Surface No. | Radius | Distance to Next Surface | Refractive Index | Abbe Number |
|---|---|---|---|---|
| 1 | 0.8890 | | | |
| | | 0.1018 | 1.7206 | 47.7 |
| 2 | 5.7732 | | | |
| | | 0.0012 | | |
| 3 | 0.4361 | | | |
| | | 0.0971 | 1.7927 | 47.2 |
| 4 | 0.6812 | | | |
| | | 0.0318 | | |
| 5 | 0.9417 | | | |
| | | 0.0237 | 1.6942 | 31.0 |
| 6 | 0.3065 | | | |
| | | 0.1400 | | |
| 7 | Aperture stop | | | |
| | | 0.1455 | | |
| 8 | −0.3464 | | | |
| | | 0.0230 | 1.7343 | 28.5 |
| 9 | 7.4804 | | | |
| | | 0.1030 | 1.7923 | 47.2 |
| 10 | −0.6071 | | | |
| | | 0.0057 | | |
| 11 | −1.7485 | | | |
| | | 0.0877 | 1.7923 | 47.2 |
| 12 | −0.5650 | | | |
| | | 0.0026 | | |
| 13 | 3.2936 | | | |
| | | 0.0567 | 1.7479 | 44.5 |
| 14 | −2.6223 | | | |

Appendix 1F
(Prior Art)
Pentac

Focal Length: EFL = 1.0000
Aperture ratio: 1:5.6
Back Focal Length: BFL = .8594
Field Angle: 2 × 15°

| Surface No. | Radius | Distance to Next Surface | Refractive Index | Abbe Number |
|---|---|---|---|---|
| 1 | 0.3726 | | | |
| | | 0.0423 | 1.6940 | 54.5 |
| 2 | −0.5476 | | | |
| | | 0.0159 | 1.5848 | 40.6 |
| 3 | 1.2182 | | | |
| | | 0.0700 | | |
| 4 | Aperture stop | | | |
| | | 0.0155 | | |
| 5 | −0.4129 | | | |
| | | 0.0129 | 1.5510 | 45.5 |
| 6 | 0.3471 | | | |
| | | 0.0704 | | |
| 7 | −15.4561 | | | |
| | | 0.0159 | 1.5848 | 40.6 |
| 8 | 0.3748 | | | |
| | | 0.0358 | 1.6940 | 54.5 |
| 9 | −0.3983 | | | |

Appendix 2

| Radius | Thickness | Medium | Refractive Index | Abbe Number |
|---|---|---|---|---|
| $d_a = 0.3$ | | | | |
| | $t_{ab} = .001$ | air | | |
| $r_b$ = flat base curve, aspheric | | | | |
| | $t_{bc} = .001$ | co-polymer | $n_{bc} = 1.567$ | $v_{bc} = 33.5$ |
| $r_c = .2710$ | | | | |
| | $t_{cd} = 1.996$ | Schott LaSFN3 | $n_{cd} = 1.8127$ | $v_{cd} = 40.5$ |

-continued

Appendix 2

| Radius | Thickness | Medium | Refractive Index | Abbe Number |
|---|---|---|---|---|
| $r_d = -.2710$ | | | | |
| | $t_{de} = .001$ | co-polymer | $n_{de} = 1.567$ | $v_{de} = 33.5$ |
| $r_e$ = flat base curve, aspheric | | | | |
| | $t_{ef} = .001$ | air | | |
| $d_f = 0.3$ | | | | |

$AD_b = -2.04$ e-8 $AE_b = -1.55$ e-11 $AF_b = -1.59$ e-14
$AG_b = -3.03$ e-17
$AD_e = 2.04$ e-8 $AE_e = 1.55$ e-11 $AF_e = 1.59$ e-14
$AG_e = 3.03$ e-17

Appendix 3

| Radius | Thickness | Medium | Refractive Index | Abbe Number |
|---|---|---|---|---|
| $d_a = 0.3$ | | | | |
| | $t_{ab} = .01$ | air | | |
| $r_b = -3.0000$ | | | | |
| | $t_{bc} = .200$ | Schott LaF21 | $n_{bc} = 1.7923$ | $v_{bc} = 47.4$ |
| $r_c = -.4000$ | | | | |
| | $t_{cd} = .020$ | Co-polymer | $n_{cd} = 1.567$ | $v_{cd} = 33.5$ |
| $r_d = -1.9957$, aspheric | | | | |
| | $t_{de} = 1.54$ | air | | |
| $r_e = -1.9957$, aspheric | | | | |
| | $t_{ef} = .020$ | co-polymer | $n_{ef} = 1.567$ | $v_{ef} = 33.5$ |
| $r_f = .4000$ | | | | |
| | $t_{fg} = .200$ | Schott LaF21 | $n_{fg} = 1.7923$ | $v_{fg} = 47.4$ |
| $r_g = 3.0000$ | | | | |
| | $t_{gh} = .01$ | air | | |
| $d_h = 0.3$ | | | | |

$AD_d = 9.37$ e-9 $AE_d = 2.91$ e-12 $AF_d = 1.69$ e-15
$AG_d = 1.32$ e-16
$AD_e = -9.37$ e-9 $AE_e = -2.91$ e-12 $AF_e = -1.69$ e-15
$AG_e = -1.32$ e-16

Appendix 4

| Radius | Thickness | Medium | Refractive Index | Abbe Number |
|---|---|---|---|---|
| $d_a = 0.3$ | | | | |
| | $t_{ab} = .150$ | Schott LaSF5 | $n_{ab} = 1.8858$ | $v_{ab} = 40.8$ |
| $r_b = -.3777$ | | | | |
| | $t_{bc} = .02$ | co-polymer | $n_{bc} = 1.567$ | $v_{bc} = 33.5$ |
| $r_c = 2.0000$, aspheric | | | | |
| | $t_{cd} = 1.66$ | air | | |
| $r_d = -2.0000$, aspheric | | | | |
| | $t_{de} = .02$ | co-polymer | $n_{de} = 1.567$ | $v_{de} = 33.5$ |
| $r_e = .3777$ | | | | |
| | $t_{ef} = .150$ | Schott LaSF5 | $n_{ef} = 1.8858$ | $v_{ef} = 40.8$ |
| $d_f = 0.3$ | | | | |

$AD_c = 1.97$ e-8 $AE_c = 1.26$ e-11 $AF_c = 1.14$ e-14
$AG_c = 1.68$ e-17
$AD_d = -1.97$ e-8 $AE_d = -1.26$ e-11 $AF_d = -1.14$ e-14
$AG_d = -1.68$ e-17

Appendix 5

| Radius | Thickness | Medium | Refractive Index | Abbe Number |
|---|---|---|---|---|
| $d_a = 0.3$ | | | | |
| | $t_{ab} = 0$ | air | | |
| $r_b = 1.2000$ | | | | |
| | $t_{bc} = .120$ | Schott | $n_{bc} = 1.8858$ | $v_{bc} = 40.8$ |
| | | LaSF5 | | |
| $r_c = -.4366$ | | | | |
| | $t_{cd} = .020$ | co-polymer | $n_{cd} = 1.5670$ | $v_{cd} = 33.5$ |
| $r_d = 1.0000$ | | | | |
| | $t_{de} = .010$ | air | | |
| $r_e$ = flat | | | | |
| | $t_{ef} = 1.700$ | Schott SF6 | $n_{ef} = 1.8126$ | $v_{ef} = 25.2$ |
| $r_f$ = flat | | | | |
| | $t_{fg} = .010$ | air | | |
| $r_g = -1.0000$ | | | | |
| | $t_{gh} = .020$ | co-polymer | $n_{gh} = 1.5670$ | $v_{gh} = 33.5$ |
| $r_h = .4366$ | | | | |
| | $t_{hi} = .120$ | Schott LaSF5 | $n_{hi} = 1.8858$ | $v_{hi} = 40.8$ |
| $r_i = -1.2000$ | | | | |
| | $t_{ij} = 0$ | air | | |
| $d_j = 0.3$ | | | | |

$AD_d = 2.35$ e-8 $AE_d = 1.88$ e-11 $AF_d = 1.93$ e-14
$AG_d = 3.69$ e-17
$AD_g = -2.35$ e-8 $AE_g = -1.88$ e-11 $AF_g = -1.93$ e-14
$AG_g = -3.69$ e-17

Appendix 6A

Focal length: EFL = 1.000
Aperture ratio: 1:16
Back focal length: BFL = 0.8658
Field angle: 2 × 50°

| Radius | Thickness | Medium | Refractive Index | Abbe Number |
|---|---|---|---|---|
| $r_a = 0.9888$ | | | | |
| | $t_{ab} = 0.0100$ | Schott LLF1 | $n_{ab} = 1.5510$ | $v_{ab} = 45.5$ |
| $r_b = 0.1507$ | | | | |
| | $t_{bc} = 0.0500$ | Schott LaF21 | $n_{bc} = 1.7923$ | $v_{bc} = 47.4$ |
| $r_c = 0.4586$ | | | | |
| | $t_{cd} = 0.0848$ | air | | |
| $d_d$ = aperture stop diameter = 0.056 | | | | |
| | $t_{de} = 0.0789$ | air | | |
| $r_e = -0.5200$ | | | | |
| | $t_{ef} = 0.0500$ | Schott LaF21 | $n_{ef} = 1.7923$ | $v_{ef} = 47.4$ |
| $r_f = -0.1524$ | | | | |
| | $t_{fg} = 0.0100$ | Schott LLF1 | $n_{fg} = 1.5510$ | $v_{fg} = 45.5$ |
| $r_g = -1.2519$ | | | | |

Appendix 6B

Focal length: EFL = 1.000
Aperture ratio: 1:16
Back focal length: BFL = 0.8302
Field angle: 2 × 50°

| Radius | Thickness | Medium | Refractive Index | Abbe Number |
|---|---|---|---|---|
| $r_a = 0.8394$ | | | | |
| | $t_{ab} = 0.0100$ | Co-polymer | $n_{ab} = 1.5510$ | $v_{ab} = 33.5$ |
| $r_b = 0.1863$ | | | | |
| | $t_{bc} = 0.0500$ | Schott LaSF5 | $n_{bc} = 1.8858$ | $v_{bc} = 40.8$ |
| $r_c = 0.4565$ | | | | |
| | $t_{cd} = 0.1123$ | air | | |
| $d_d$ = aperture stop diameter = 0.054 | | | | |
| | $t_{de} = 0.1121$ | air | | |
| $r_e = -0.4420$ | | | | |
| | $t_{ef} = 0.0500$ | Schott LaSF5 | $n_{ef} = 1.8858$ | $v_{ef} = 40.8$ |

-continued

Appendix 6B $r_f = -0.1926$

| | $t_{fg} = 0.0100$ | Co-polymer | $n_{fg} = 1.567$ | $\nu_{fg} = 33.5$ |

$r_g = -0.7080$

Appendix 7

| Radius | Thickness | Medium | Refractive Index | Abbe Number |
|---|---|---|---|---|
| $d_a = 30.0$ | | | | |
| | $t_{ab} = 3.000$ | air | | |
| $r_b = -36.340$ | | | | |
| | $t_{bc} = 8.000$ | polystyrene | $n_{bc} = 1.5713$ | $\nu_{bc} = 30.8$ |
| $r_c = 44.493$ | | | | |
| | $t_{cd} = 20.000$ | Schott LaSFN1 | $n_{cd} = 1.8858$ | $\nu_{cd} = 41$ |
| $r_d = -57.064$ | | | | |
| | $t_{de} = 1.000$ | air | | |
| $r_e = $ flat | | | | |
| | $t_{ef} = 163.000$ | Schott SF6 | $n_{ef} = 1.8126$ | $\nu_{ef} = 25.2$ |
| $r_f = $ flat | | | | |
| | $t_{fg} = 1.000$ | air | | |
| $r_g = 57.064$ | | | | |
| | $t_{gh} = 20.000$ | Schott LaSF31 | $n_{gh} = 1.8858$ | $\nu_{gh} = 41$ |
| $r_h = -44.493$ | | | | |
| | $t_{hi} = 8.000$ | polystyrene | $n_{hi} = 1.5713$ | $\nu_{hi} = 30.8$ |
| $r_i = 36.340$ | | | | |
| | $t_{ij} = 3.000$ | air | | |
| $d_j = 30.0$ | | | | |

$AD_b = -4.33$ e-8  $AE_b = -9.54$ e-11  $AF_b = 0$  $AG_b = 0$

-continued

Appendix 7

| Radius | Thickness | Medium | Refractive Index | Abbe Number |
|---|---|---|---|---|

$AD_i = 4.33$ e-6  $AE_i = 9.54$ e-9  $AF_i = 0$  $AG_i = 0$

I claim:

1. A paired doublet and cylinder assembly defining half a transfer module for an endoscope relay system comprising elements made of optical materials and having normalized geometrical parameters as follows:

| Radius | Thickness | Medium | Refractive Index | Abbe Number |
|---|---|---|---|---|
| $d_a = $ stop diameter = 30.0 | $t_{ab} = 3.000$ | air | | |
| $r_b = -36.340$, aspheric | $t_{bc} = 8.000$ | polystyrene | $n_{bc} = 1.5713$ | $\nu_{bc} = 30.8$ |
| $r_c = 44.493$ | $t_{cd} = 20.000$ | Schott LaSF31 | $n_{cd} = 1.8858$ | $\nu_{cd} = 41$ |
| $r_d = -57.064$ | $t_{de} = 1.000$ | air | | |
| $r_e = $ flat | $t_{ef} = 163.000$ | Schott SF6 | $n_{ef} = 1.8126$ | $\nu_{ef} = 25.2$ |
| $r_f = $ flat | $t_{fg} = 1.000$ | air | | |
| $r_g = 57.064$ | $t_{gh} = 20.000$ | Schott LaSF31 | $n_{gh} = 1.8858$ | $\nu_{gh} = 41$ |
| $r_h = -44.493$ | $t_{hi} = 8.000$ | polystyrene | $n_{hi} = 1.5713$ | $\nu_{hi} = 30.8$ |
| $r_i = 36.340$, aspheric | $t_{ij} = 3.000$ | air | | |
| $d_j = $ stop diameter = 30.0 | | | | |

Aspheric Coefficients $AD_b = -4.33$ e-6   $AE_b = -9.54$ e-9   $AF_b = 0$   $AG_b = 0$
$AD_i = 4.33$ e-6    $AE_i = 9.54$ e-9    $AF_i = 0$   $AG_i = 0$ where the single subscripts denote the characteristic surfaces of the elements and the double subscripts denote the regions between corresponding surfaces.

* * * * *